United States Patent [19]

Crisenbery et al.

[11] 4,051,936
[45] Oct. 4, 1977

[54] FLUID COUPLING DEVICE AND VALVE SUPPORT USED THEREIN

[75] Inventors: Richard T. Crisenbery, Parma; Thomas H. Tinholt, Marshall, both of Mich.

[73] Assignee: Eaton Corporation, Cleveland, Ohio

[21] Appl. No.: 692,402

[22] Filed: June 3, 1976

[51] Int. Cl.² .................. F16D 35/00; F16D 43/25
[52] U.S. Cl. .............................. 192/58 B; 192/82 T
[58] Field of Search ........................ 192/58 B, 82 T

[56] References Cited

U.S. PATENT DOCUMENTS

| | | | |
|---|---|---|---|
| 3,339,689 | 9/1967 | Sutaruk | 192/58 B |
| 3,613,847 | 10/1971 | Masai | 192/58 B |

*Primary Examiner*—Allan D. Herrmann
*Attorney, Agent, or Firm*—Teagno & Toddy

[57] ABSTRACT

A fluid coupling device of the type including a rotatable input coupling member, a cover associated therewith to define a fluid chamber, a valve plate separating the fluid chamber into an operating chamber and a reservoir chamber, and an output coupling member disposed in the operating chamber and rotatable relative to the input coupling member. The valve plate defines a discharge orifice permitting the flow of fluid from the operating chamber to the reservoir chamber and a generally flat valve member is located within the reservoir chamber and disposed to move in a plane substantially parallel to the plane of the valve plate to vary the flow area of the discharge orifice. The movement of the valve member defines a valve operating area and the cover includes a portion coextensive with the valve operating area and oriented substantially parallel to the plane of movement of the valve member. The cover portion is closely spaced from the valve member during movement thereof to prevent "blowoff" of the portion of the valve member adjacent the discharge orifice as fluid flows from the operating chamber to the reservoir chamber.

18 Claims, 4 Drawing Figures

FLUID COUPLING DEVICE AND VALVE SUPPORT USED THEREIN

BACKGROUND OF THE DISCLOSURE

The present invention relates to torque transmitting fluid couplings, and more particularly, to such couplings which utilize internal, temperature-responsive valving to control the flow of fluid within the fluid coupling.

Fluid couplings of the type to which the present invention relates are well known in the art and may be better understood by reference to U. S. Pat. Nos. 3,055,473; 3,174,600; and 3,339,689, assigned to the assignee of the present invention. Briefly, such fluid couplings typically include a coupling body and a cover which cooperate to define a fluid chamber, and a valve plate dividing the fluid chamber into a fluid operating chamber and a fluid reservoir chamber. A coupling member is disposed within the fluid operating chamber and is rotatable relative to the coupling body, the body and member each including a plurality of concentric annular lands alternately positioned such that rotation of the coupling member causes the viscous fluid in the operating chamber (and between the lands) to exert a viscous drag on the coupling body, thereby rotating the body. The valve plate defines a fill orifice and a discharge orifice communicating between the operating chamber and the reservoir chamber. Some form of temperature-responsive valving arrangement controls the flow of fluid through the fill and discharge orifices, such that the amount of fluid in the operating chamber increases when the temperature increases and decreases when the temperature decreases.

It is well known in the art, as shown in U. S. Pat. No. 3,613,847 to utilize a single temperature-responsive valve member to control, generally simultaneously, the flow areas of both the fill and discharge orifices. This arrangement may be generally advantageous because, under increasing temperature conditions, the flow area of the discharge orifice is reduced as the flow area of the fill orifice is increasing, thus permitting a more rapid increase in the volume of fluid in the operating chamber, resulting in a more rapid rise in the output speed of the coupling device.

Therefore, although the utilization of the present invention requires only that a valve member be used to vary the flow area of the discharge orifice, it is more probable that the invention would be used in the environment described above, i.e., where a single valve member controls the flow areas of both the fill and discharge orifices, simultaneously, and therefore, the invention will be described in connection therewith.

A problem which has arisen in connection with the use of the valving arrangement described above is what is frequently referred to as "blowoff," i.e., the tendency for the valve member to be blown or moved away from the valve plate by the flow of fluid from the operating chamber through the discharge orifice. This is especially likely to occur in situations in which, except for the valve member covering the discharge orifice, the result would be "high-speed pump out," i.e., the tendency for fluid to be pumped out the discharge orifice at a faster rate than it enters the fill orifice at high input speeds.

Prior attempts to solve this problem have generally centered around the valve member itself. For example, the valve member has been made thicker in an attempt to increase the rigidity and decrease the tendency for the valve to deflect away from the valve plate. This solution has been generally satisfactory in certain larger coupling devices wherein the temperature-responsive means utilized to control the valve position is capable of exerting sufficient torque to overcome the increased weight of the valve member, as well as the frictional forces associated with the movement of the valve member.

However, in the majority of the fluid coupling devices used for automotive accessories such as radiator fans, the temperature-responsive means, typically a bimetal coil, is capable of exerting only a relatively small torque on the valve member (such as 1.0 inch-ounces per degree of angular deflection of the valve member.) It has been found that such a torque output capability on the part of the bimetal coil dictates a very thin, light valve member, typically, in the range of about 0.005 to 0.010 inches (0.127 to 0.254 mm). Therefore, although the present invention may be utilized with fluid coupling devices in which the valve member is selected from any one of a number of configurations and sizes, it is especially advantageous when used with a generally flat, thin valve member having approximately the above-mentioned thickness, and will be described in connection therewith.

SUMMARY OF THE INVENTION

Accordingly, it is an object of the present invention to provide an improved fluid coupling device of the type including temperature-responsive valving for controlling the flow of fluid from the operating chamber to the reservoir chamber, through the discharge orifice.

It is another object of the present invention to provide such an improved fluid coupling device including means for supporting and/or restraining the valve member to substantially prevent, or at least minimize the blowoff of the valve member away from the valve plate.

It is a more specific object of the present invention to provide an improved fluid coupling device in which the above-stated object is achieved without modification of the valve member, and without the need for additional parts and the manufacturing and assembly cost associated therewith.

The above and other objects of the present invention are accomplished by the provision of a fluid coupling device including a first rotatable member, cover means associated with the first member to define a fluid chamber therebetween and a valve plate disposed to separate the chamber into a fluid operating chamber and a fluid reservoir chamber. A second rotatable member is disposed in the fluid operating chamber and is rotatable relative to the first member. The valve plate defines a discharge orifice adapted to permit the flow of fluid from the fluid operating chamber to the fluid reservoir chamber and a generally flat valve member is located within the fluid reservoir chamber and disposed to move in a plane substantially parallel to the plane of the valve plate. The valve member is further disposed to cooperate with the discharge orifice to vary the effective flow area thereof and a temperature-responsive means is operatively associated with the valve member to control the movement thereof. The range of movement of the valve member defines a valve operating area and either the cover means or the valve plate includes a restraining portion which is coextensive with at least the valve operating area and is oriented substantially parallel to the plane of movement of the valve member, and closely spaced therefrom during the valve member movement to prevent substantial movement of the portion of the valve member adjacent the discharge orifice, in a direction away from the valve plate.

In accordance with a more limited aspect of the present invention, the restraining portion comprises a portion of the cover means, which comprises a single piece, the restraining portion being an integral portion of that single piece.

DESCRIPTION OF THE PREFERRED EMBODIMENT

Figure 1:
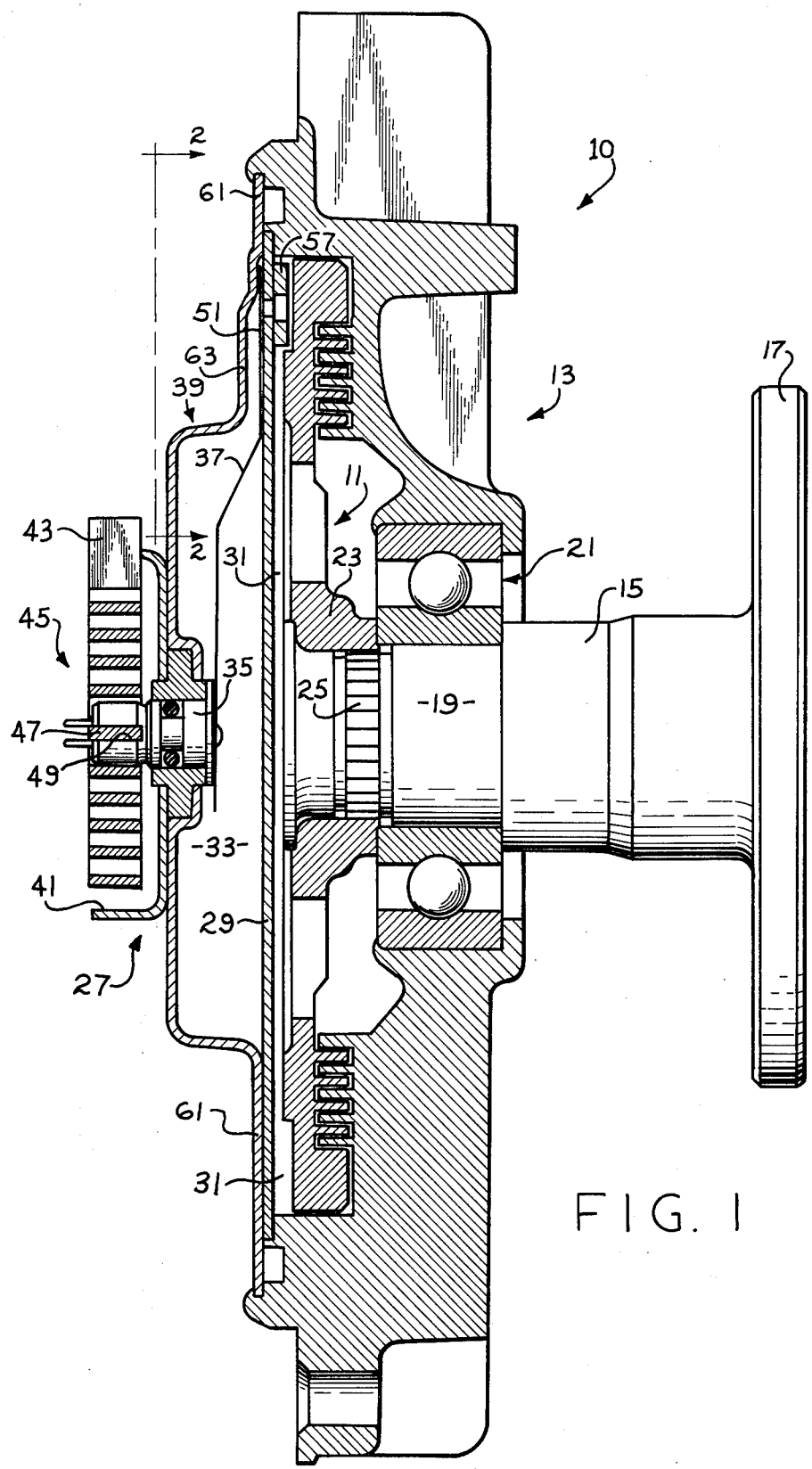
FIG. 1 is a cross section of a typical fluid coupling device utilizing the present invention.

Referring now to the drawings, which are not intended to limit the present invention, FIG. 1 illustrates the preferred form of a fluid coupling device, generally designated 10, with which the present invention may be utilized. The fluid coupling device 10 includes an input coupling member 11 and an output coupling member 13. The fluid coupling 10 is shown herein as a drive for an automotive engine accessory, and specifically, as a drive for a radiator cooling fan. It will be understood, however, that the use of the present invention is not limited to any particular fluid coupling configuration or application.

The fluid coupling 10 includes an input shaft 15 on which input member 11 is mounted and which is rotatably driven, such as by means of a flange 17 which, in the subject embodiment, may be bolted to the water pump flange (not shown).

The input shaft 15 has a reduced shaft portion 19 intermediate its ends, and functioning as a support for the inner race of a bearing set 21 which is seated on the inside diameter of the output coupling member 13.

The input coupling member 11 is in the form of a disc having a hub portion 23 supported by the forward end of the shaft 15. The hub portion 23 has an opening therethrough which has an interference fit with a serrated portion 25 of the shaft 15. The hub portion 23 is pressed onto the shaft 15 until it abuts the side of the inner race of the bearing set 21, and the output end (left end in FIG. 1) of the shaft 15 is balled over to positively retain the input coupling member 11 on the shaft, such that rotation of the shaft 15 causes rotation of the input coupling member 11.

The output coupling member 13 cooperates with a cover assembly generally designated 27, to define a fluid chamber therebetween, the fluid chamber being separated by a valve plate 29 into a fluid operating chamber 31 and a fluid reservoir chamber 33. Rotatably supported by the cover assembly 27 is a valve shaft 35 having attached to its inner end (right end in FIG. 1), a valve arm 37, the general construction and operation of which may be better understood by reference to the above-mentioned U. S. Pat. No. 3,055,473. The cover assembly 27 includes a cover member 39 which, in the subject embodiment, is a single piece metal stamping.

Attached, as by welding, to the outer surface of the cover member 39 is a bracket member 41 which supports an outer end 43 of a bimetal coil, generally designated 45, with an inner end 47 thereof which is positioned in a slot 49 formed in the outer end of the valve shaft 35. It should be understood that the scope of the present invention is not limited to any particular configuration of bimetal element, configuration of valve arm or functional relationship of bimetal and valve arm, as long as they are related in such a manner that the valve arm 37 moves in a plane generally parallel to the plane of the valve plate 29 in response to changing temperatures.

Figure 4:
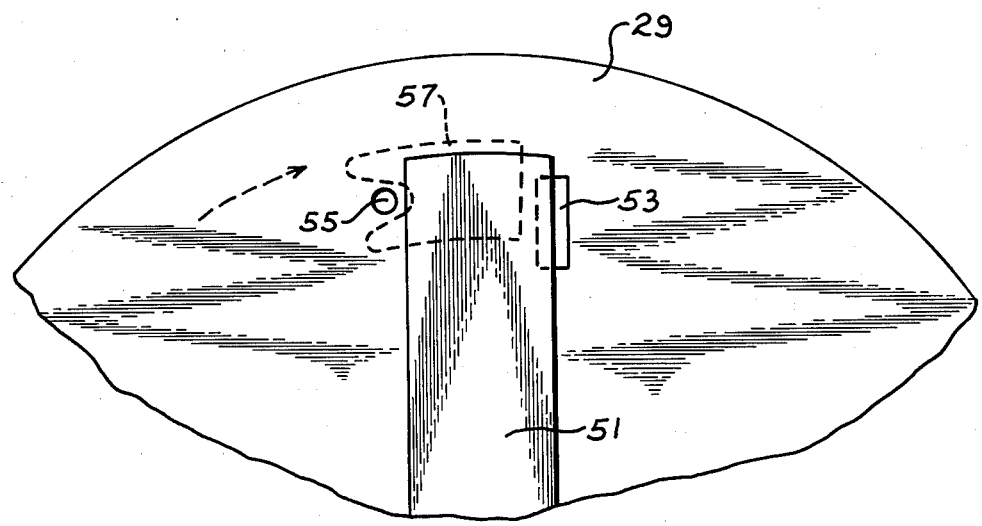
FIG. 4 is a plan view, similar to FIG. 2, and on approximately the same scale, illustrating one embodiment of the valving with which the present may be utilized.

Referring now to FIG. 4, a plan view of the valving arrangement of the subject embodiment is shown. The valve arm 37 includes a valve portion 51 which is disposed adjacent the surface of the valve plate 29 and moves parallel thereto as the temperature varies, the movement of the valve portion 51 defining a generally arcuate valve operating area. With the input coupling member 11 assumed to be rotating clockwise as viewed from the left in FIG. 1, the viscous fluid in the operating chamber 31 is moving in the direction indicated by the dotted arrow in FIG. 4, relative to the valve plate 29, coupling output member 13 and cover assembly 27, all of which rotate as a unit. The valve plate 29 defines a fill orifice 53 and a discharge orifice 55. A pumping element 57 is mounted on the underside of the valve plate 29 (right side in FIG. 1), and engages the "rotating" fluid to cause a pressure buildup in the area of the discharge orifice 55, thereby causing a flow from the operating chamber 31 into the reservoir chamber 33 through the discharge orifice 55 when the valve portion 51 exposes at least a portion of the flow area of discharge orifice 55.

Figure 2:
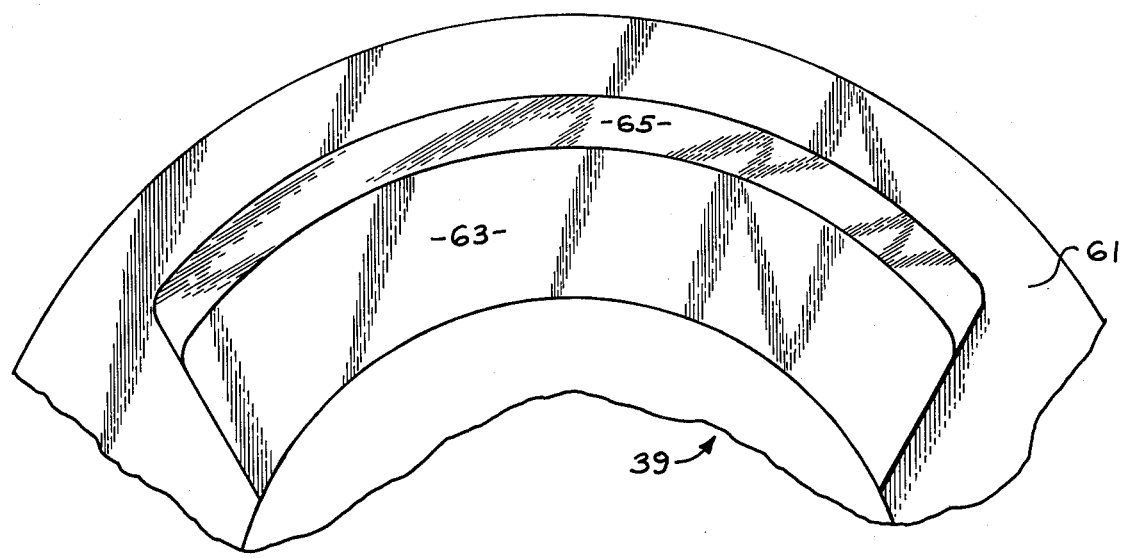
FIG. 2 is a fragmentary plan view taken on line 2—2 of FIG. 1, of the cover alone.
Figure 3:
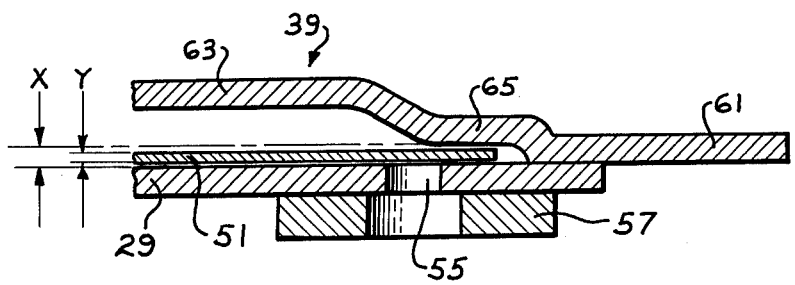
FIG. 3 is an enlarged fragmentary cross section, similar to FIG. 1, illustrating the invention.

As may best be seen by reference to FIGS. 2 and 3, the subject embodiment of the present invention utilizes the cover member 39 to support and restrain the valve portion 51 and minimize blowoff, or separation of the valve portion 51 from the valve plate 29 when the valve portion 51 is positioned over at least a portion of the discharge orifice 55. The valve member 39 includes a first, generally planar portion 61 disposed toward the outer periphery of the cover member 39, and which has its underside in a substantially face-to-face relationship with the surface of the valve plate 29 and, as may be seen in FIG. 1, has its outer extremity in engagement with a portion of the output coupling member 13 which is crimped over to restrain the entire cover assembly 28 relative to the output coupling member 13. The cover member 39 also includes a second, generally planar cover portion 63 which, as is seen in FIG. 2, in generally arcuate. Intermediate the planar portions 61 and 63 is a third, generally planar cover portion 65, which serves to support and/or restrain the outer extremity of the valve portion 51 in the region of the discharge orifice 55.

Still referring to FIG. 2, the third cover portion 65 is also shown as generally arcuate, with the circumferential extent of the cover portion 65 being substantially greater than the valve operating area defines by the angular travel of the valve portion 51. It should be apparent that, for purposes of the present invention, the cover portion 65 is required only to be coextensive with the valve operating area. As used herein, the term "coextensive" refers to the circumferential direction only, there being no need for the cover portion 65 to support and restrain the valve portion 51 over its entire radial extent. It should also be understood that the cover portion 65 is not limited to any particular configuration or features, other than those specifically mentioned herein.

As may best be seen in FIG. 3, the underside of the cover portion 65 and the upper surface of the valve plate 29 adjacent thereto define a clearance, designated X, while the valve portion 51 has a thickness, designated Y. Typically, the clearance X is in the range of about 0.020 inches (0.508 mm) to about 0.040 inches (1.016 mm), and in the subject embodiment, the clearance X is toward the lower end of the indicated range. The thickness Y of the valve portion 51 is typically less than about 0.020 inches (0.508 mm), and in the subject embodiment, is about 0.005 inches (0.127 mm). It will be appreciated that the clearance X and thickness Y of valve portion 51 should be related to the size of the discharge orifice 55, i.e., the permissible blowoff of the valve portion 51 (blowoff equals X minus Y) should be sufficiently small in relation to the size of discharge orifice 55 such that, even at the maximum blowoff of the valve portion 51, the effective flow area of the orifice 55 will not be so greatly increased as to negate the attempt to vary the size of the orifice in response to varying temperatures and operating conditions. For example, in one commercial embodiment of the present invention, the discharge orifice 55 is circular and has a diameter of approximately 0.060 inches (1.52 mm), with the maximum blowoff being about 0.015 inches (0.038 mm), or about one-fourth the diameter of the orifice 55.

We claim:

1. A fluid coupling device including a first rotatable member, cover means associated with said first member to define a fluid chamber therebetween, a valve plate disposed to separate said fluid chamber into a fluid operating chamber and a fluid reservoir chamber, a second rotatable member disposed in said fluid operating chamber and being rotatable relative to said first member, said valve plate defining a discharge orifice adapted to permit the flow of fluid from said fluid operating chamber to said reservoir chamber, a generally flat valve member located within said fluid reservoir chamber and disposed to move in a plane substantially parallel to the plane of said valve plate, said valve member further being disposed to cooperate with said discharge orifice to vary the effective flow area thereof, temperature-responsive means operatively associated with said valve member to control the movement of said valve member, the range of movement of said valve member defining a valve operating area, one of said cover means and said valve plate including a generally planar restraining portion coextensive at least with said valve operating area, oriented substantially parallel to the plane of movement of said valve member and closely spaced therefrom during said valve member movement and being operable to engage said valve member in a surface-to-surface relationship and prevent excessive movement of the portion of said valve member adjacent said discharge orifice in a direction away from said valve plate.

2. A fluid coupling device as claimed in claim 1 wherein said temperature-responsive means comprises a bimetal element and means for translating movement of said bimetal element into movement of said valve member.

3. A fluid coupling device as claimed in claim 2 wherein said bimetal element comprises a generally helical coil, said movement translating means comprises a valve shaft rotatably mounted relative to said cover means and connected to a portion of said bimetal coil, said valve member being mounted on said valve shaft for rotary movement about the axis of rotation of said valve shaft.

4. A fluid coupling device as claimed in claim 2 wherein said movement of said valve member is about an axis defined by said translating means and said bimetal element exerts a torque on said valve member less than about 1.0 inch-ounce (0.007 N-m) per degree of angular deflection of said valve member.

5. A fluid coupling device as claimed in claim 3 wherein said valve operating area is generally arcuate.

6. A fluid coupling device as claimed in claim 1 wherein said valve member has a thickness less than about 0.020 inches (0.508 mm) in the region of said discharge orifice.

7. A fluid coupling device as claimed in claim 6 wherein said restraining portion is spaced from said valve plate a distance in the range of about 0.020 inches (0.508 mm) to about 0.040 inches (1.016 mm).

8. A fluid coupling device as claimed in claim 1 wherein said restraining portion comprises a portion of said cover means.

9. A fluid coupling device as claimed in claim 1 wherein said cover means primarily comprises a single piece, and said restraining portion comprises an integral portion of said single piece.

10. A fluid coupling device as claimed in claim 9 wherein said single piece is a metal stamping, and said valve operating area and said restraining portion are generally arcuate.

11. A fluid coupling device as claimed in claim 1 wherein said valve plate further defines a fill orifice permitting the flow of fluid from said fluid reservoir chamber to said fluid operating chamber.

12. A fluid coupling device as claimed in claim 11 wherein said valve member is disposed to vary the effective flow area of said fill orifice.

13. A fluid coupling device as claimed in claim 12 wherein said valve member is operable to gradually restrict the flow area of said discharge orifice and gradually increase the flow area of said fill orifice when said temperature-responsive means is subjected to an increasing temperature, and to gradually increase the flow area of said discharge orifice and gradually restrict the flow area of said fill orifice when said temperature-responsive means is subjected to a decreasing temperature.

14. A fluid coupling device as claimed in claim 1 wherein said valve member has a thickness less than about 0.010 inches (0.254 mm) in the region of said discharge orifice, and said restraining portion is spaced from said valve plate a distance greater than said thickness of said valve member in the range of about 0.005 inches (0.127 mm) to about 0.030 inches (0.762 mm).

15. A fluid coupling device including a first rotatable member, cover means associated with said first member to define a fluid chamber therebetween, a valve plate disposed to separate said fluid chamber into a fluid operating chamber and a fluid reservoir chamber, a second rotatable member disposed in said fluid operating chamber and being rotatable relative to said first member, said valve plate defining a fill orifice permitting the flow of fluid from said fluid reservoir chamber to said fluid operating chamber and a discharge orifice permitting the flow of fluid from said fluid operating chamber to said fluid reservoir chamber, valve means including a generally flat, relatively thin valve arm disposed within said fluid reservoir chamber and temperature-responsive means for controlling the movement of said valve arm, said valve arm being operable to move in a plane substantially parallel to the plane of said valve plate, said valve arm being disposed to gradually restrict the flow area of said discharge orifice and gradually increase the flow area of said fill orifice when said temperature-responsive means is subjected to an increasing temperature, and to gradually increase the flow area of said discharge orifice and gradually restrict the flow area of said fill orifice when said temperature-responsive means is subjected to a decreasing temperature, the range of said movement of said valve arm defining a valve operating area, one of said cover means and said valve plate including a restraining portion generally coextensive with said valve operating area, said restraining portion being oriented substantially parallel to the plane of movement of said valve arm and closely spaced from said valve arm to prevent excessive movement of said valve arm away from said valve plate.

16. A fluid coupling device as claimed in claim 15 wherein said cover means comprises a single piece cover member and said restraining portion comprises an integral portion of said single piece cover member.

17. A fluid coupling device as claimed in claim 15 wherein said valve arm has a thickness less than about 0.020 inches (0.508 mm) in the region adjacent said discharge orifice and said restraining portion is spaced from said valve plate a distance in the range of about 0.020 inches (0.508 mm) to about 0.040 inches (1.016 mm).

18. A fluid coupling device including an input coupling member, and output coupling member rotatable relative to said input coupling member, cover means associated with said output coupling member to define a fluid chamber therebetween, a valve plate disposed to separate said fluid chamber into a fluid operating chamber and a fluid reservoir chamber, said input coupling member being disposed in said fluid operating chamber, said valve plate defining a discharge orifice adapted to permit the flow of fluid from said operating chamber to said reservoir chamber and a fill orifice permitting the flow of said from said reservoir chamber to said operating chamber, valve means including a generally flat, relatively thin valve arm disposed within said fluid reservoir chamber and temperature-responsive means for controlling the rotary movement of said valve arm in a plane substantially parallel to the plane of said valve plate, said valve arm being disposed to gradually restrict the flow area of said discharge orifice and gradually increase the flow area of said fill orifice when said temperature-responsive means is subjected to an increasing temperature, and to gradually increase the flow area of said discharge orifice and gradually restrict the flow area of said fill orifice when said temperature-responsive means is subjected to a decreasing temperature, the range of movement of said valve arm defining a valve operating area, and said cover means including a cover portion extending arcuately at least over said valve operating area and oriented substantially parallel to the plane movement of said valve arm and closely spaced therefrom during said valve arm movement to prevent excessive movement of said valve arm, adjacent said discharge orifice, in a direction away from said valve plate.

* * * * *

UNITED STATES PATENT AND TRADEMARK OFFICE
CERTIFICATE OF CORRECTION

PATENT NO. : 4,051,936

DATED : October 4, 1977

INVENTOR(S) : Richard T. Crisenbery; Thomas H. Tinholt

It is certified that error appears in the above-identified patent and that said Letters Patent are hereby corrected as shown below:

Col. 4, line 49: "28" should read "27".

Col. 8, line 10: "flow of said" should read "flow of fluid".

Signed and Sealed this

Seventeenth Day of January 1978

[SEAL]

Attest:

RUTH C. MASON
*Attesting Officer*

LUTRELLE F. PARKER
*Acting Commissioner of Patents and Trademarks*